US008959816B1

(12) United States Patent
Lorenzo

(10) Patent No.: US 8,959,816 B1
(45) Date of Patent: Feb. 24, 2015

(54) SIGN AND DISPLAY SYSTEMS

(71) Applicant: L&M Architectural Graphics, Inc., Fairfield, NJ (US)

(72) Inventor: Justin Lorenzo, Newton, NJ (US)

(73) Assignee: L&M Architectural Graphics, Inc., Fairfield, NJ (US)

( * ) Notice: Subject to any disclaimer, the term of this patent is extended or adjusted under 35 U.S.C. 154(b) by 0 days.

(21) Appl. No.: 14/242,561

(22) Filed: Apr. 1, 2014

(51) Int. Cl.
*A47G 1/06* (2006.01)
*G02B 27/02* (2006.01)

(52) U.S. Cl.
CPC ...... *G02B 27/028* (2013.01); *A47G 2001/0672* (2013.01)
USPC ............................................. 40/711

(58) Field of Classification Search
CPC ............... A47G 2001/0672; A47G 2001/0666
USPC ............... 40/711, 781, 772, 797, 661, 661.01
See application file for complete search history.

(56) References Cited

U.S. PATENT DOCUMENTS

| | | | | |
|---|---|---|---|---|
| 5,075,991 A * | 12/1991 | Wenkman et al. | ............... | 40/781 |
| 5,195,263 A * | 3/1993 | Huang | ............... | 40/761 |
| 7,406,792 B2 * | 8/2008 | Chang | ............... | 40/781 |
| 7,587,850 B2 * | 9/2009 | Vineyard | ............... | 40/781 |
| 2004/0111944 A1 * | 6/2004 | Gatt et al. | ............... | 40/781 |
| 2007/0089832 A1 * | 4/2007 | Kitchin et al. | ............... | 156/289 |
| 2011/0225861 A1 * | 9/2011 | Anzalone | ............... | 40/661 |

* cited by examiner

*Primary Examiner* — Kristina Junge
(74) *Attorney, Agent, or Firm* — Shvarts & Leiz LLP

(57) ABSTRACT

A sign and display system including a faceplate, lens, backing plate, and at least one magnet is described. The faceplate includes a viewing aperture and the back of the faceplate includes a recess in which the at least one magnet is mounted. The recess in the faceplate is configured to receive the lens and backing plate. The lens may include one or more edge protrusions configured to enter one or more small recesses in the side of the faceplate recess to secure the lens to the faceplate. When the lens and backing plate are positioned in the recess of the faceplate, the one or more magnets exert a force on the backing plate to secure the faceplate and lens to the backing plate. An insert capable of displaying text and/or graphics can also be positioned between the lens and backing plate in the recess of the faceplate.

19 Claims, 8 Drawing Sheets

SIGN AND DISPLAY SYSTEMS

The present disclosure relates to sign and display systems, such as office and workstation sign and display systems, and more particularly relates to systems that include a faceplate, lens, backing plate, and at least one magnet. The sign and display systems can be adhered to a wall surface and display text and/or graphics through the lens.

BACKGROUND

Sign and display systems are used for presenting information. For example, interior sign and display systems are used in an office environment as workstation signs and office displays. Sign and display systems are typically attached to a wall surface or partitions (e.g., cubicle partitions, partition walls, and glass partitions). Some sign and display systems include inserts on which text and graphics may be printed. The inserts can be permanently or removably attached to the sign and display systems. For example, some sign and display systems require a user to slide the insert into a thin slot. In such systems, it can be difficult to insert and remove these inserts.

The assignee of the present disclosure, L&M Architectural Graphics, Inc., produced a sign system that included a faceplate and a backing plate. The backing plate was attachable to a wall surface and the faceplate is secured to the backing plate using two round magnetics embedded in the faceplate. The faceplate of this prior sign system is shown in FIG. 1. FIG. 1 is a plan view of the back of faceplate 10. Faceplate 10 includes a back surface 12 and a recessed back surface 14. The space between the plane of back surface 12 and the plane of recessed back surface 14 within internal edge 16 forms a recess. An insert capable of displaying text and/or graphics may be placed in the recess adjacent to recessed surface 14. The text and/or graphics are visible from the front of faceplate 10 through viewing aperture 18. A backing plate (not shown) is configured to fit into the displayed recess of the faceplate. The shape of the backing plate edge is similar to the shape of inside edge 16. Two circular magnets 19A and 19B are embedded in recessed surface 14 such that the visible surfaces of magnets 19A and 19B are in the same plane as the plane of recessed back surface 3. Magnets 19A and 19B removably secure faceplate 10 to the backing plate. The prior sign system, which includes the faceplate shown in FIG. 1, however, does not include any lens to protect the insert.

SUMMARY

The present disclosure relates generally to sign and display systems comprising a faceplate, lens, a backing plate, and at least one magnet. Sign and display systems can be configured to adhere to a wall surface and display any suitable content or information such as text and/or graphics.

In some embodiments, the faceplate of the sign and display system comprises front and back surfaces, and a viewing aperture configured to enable one to see through the faceplate when the faceplate is viewed perpendicular to its front surface. The back surface may include a recessed back surface and at least one internal edge connecting the recessed back surface to the back surface. The recessed back surface and the at least one internal edge define a recess in the back of the faceplate. The at least one magnet may be mounted proximate to the recessed back surface of the faceplate. In some embodiments, the at least one magnet may be partially recessed into the recessed back surface. The lens of the wall sign comprises two surfaces and is configured to fit within the recess in the back surface of the faceplate. In some embodiments, the lens may include one or more edge protrusions configured to enter one or more small recesses in the at least one internal edge of the faceplate. In some embodiments, the lens may include one or more edge recesses to accommodate the one or more magnets. The backing plate of the wall sign also comprises two surfaces, and similarly is configured to fit within the recess in the back surface of the faceplate. The backing plate is comprised of a ferromagnetic material. When the lens and backing plate are positioned in the recess of the back surface of the faceplate, one surface of the lens faces the recessed surface, and the opposite surface of the lens faces the backing plate, and the at least one magnet exerts a force on the backing plate to maintain the faceplate, lens, and backing plate together. In some embodiments, the rear of the backing plate may include one or more sticky mediums for attachment to a surface.

In some embodiments, an insert displaying content or information such as text and/or graphics may be positioned between the lens and backing plate, and the sign and display system may be adhered to a surface (e.g., a wall surface, partition, or door), such that the text and/or graphics of the insert are visible from the front of the faceplate.

BRIEF DESCRIPTION OF THE FIGURES

The above and other features of the present disclosure, its nature and various advantages will be more apparent upon consideration of the following detailed description, taken in conjunction with the accompanying drawings in which.

DETAILED DESCRIPTION OF THE FIGURES

Figure 2:
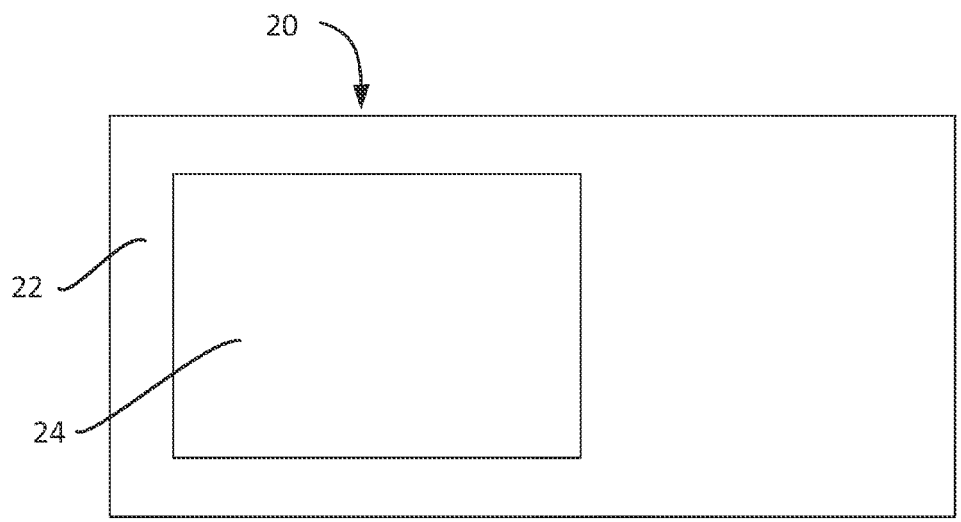
FIG. 2 is a plan view of the front of a faceplate of a sign and display system in accordance with some embodiments of the present disclosure.
Figure 3:
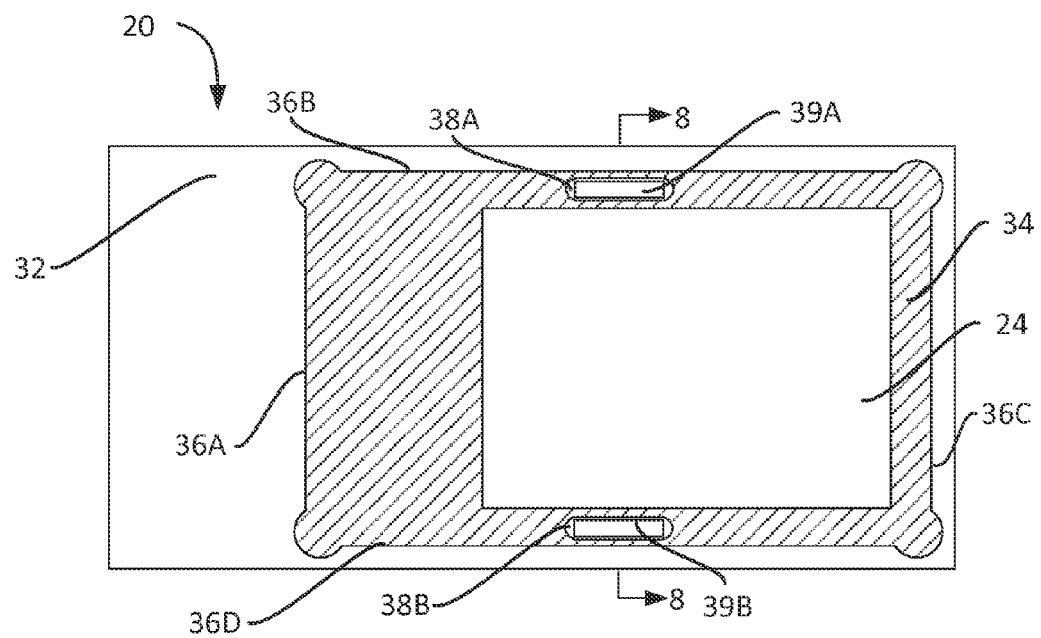
FIG. 3 is a plan view of the back of the faceplate in accordance with some embodiments of the present disclosure.
Figure 4:
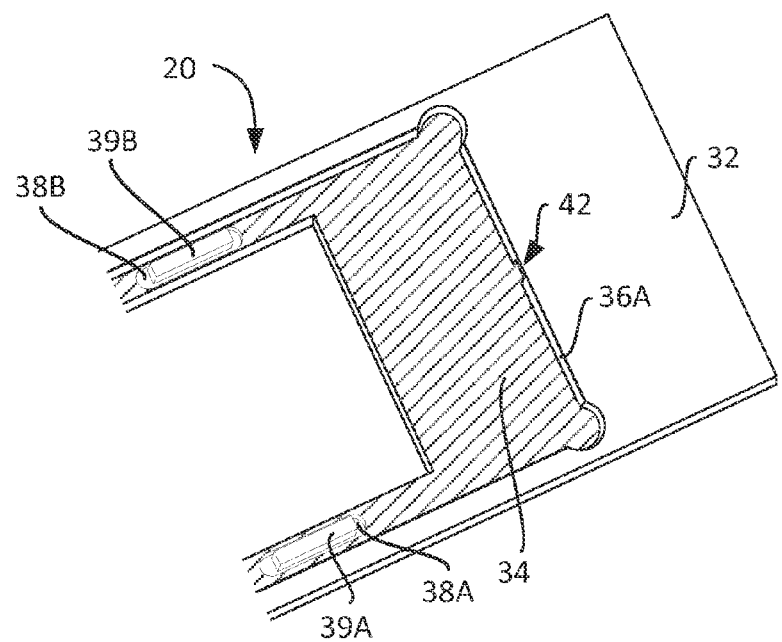
FIG. 4 is a perspective view of a portion of the faceplate in accordance with some embodiments of the present disclosure.

The present disclosure is directed towards sign and display systems. In some embodiments, the sign and display system of the present disclosure comprises a faceplate, lens, backing plate, and one or more magnets. The faceplate may include a front surface that is visible and a back surface that includes a recess for mounting the one or more magnets and for receiving the lens and the backing plate. FIGS. 2-4 show different views of faceplate 20 in accordance with some embodiments of the present disclosure.

FIG. 2 is a plan view of the front of faceplate 20 in accordance with some embodiments of the present disclosure. Faceplate 20 includes front surface 22 and viewing aperture 24. In some embodiments, front surface 22 may be a flat surface. In some embodiments, front surface 22 may include raised numbers and/or letters. For example, front surface 22 may include raised numbers and/or letters to identify a particular workstation. In some embodiments, front surface 22 may be a textured surface. Faceplate 20 may be made of any suitable material or combination of materials. For example, faceplate 20 may be made of metal (e.g., aluminum, brass, bronze, copper, stainless steel, and/or titanium), plastic (e.g., acrylic, petg, pvc, delrin, polycarbonate, and/or high density urethane), a solid surface (e.g., solid surfaces sold under the trademarks Corian and Avonite), wood, recycled material (e.g., recycled paper boards sold under the trademark PaperStone), any other suitable material, and any combination thereof. Viewing aperture 24 enables one to see through faceplate 20, for example, when faceplate 20 is viewed generally perpendicular to front surface 22. As illustrated, faceplate 22 and viewing aperture 24 are rectangular in shape. However, in some embodiments, the faceplate and viewing aperture may be any suitable shape and/or size.

FIG. 3 is a plan view of the back of faceplate 20 in accordance with some embodiments of the present disclosure. Faceplate 20 includes back surface 32 and recessed surface 34. At least one external edge connects back surface 32 and front surface 22. As illustrated, the at least one external edge comprises four straight edges in the shape of a rectangle. Aperture 24 is also visible from the back of faceplate 20. In the illustrated embodiment, internal edges 36A-D connect recessed surface 34 to back surface 32. Thus, the plane of recessed surface 34 and internal edges 36A-D define a recess in the back of faceplate 20. Recessed surface 34 comprises recesses 38A and 38B, which are configured to receive magnets 39A and 39B. In some embodiments, a portion of each of magnets 39A and 39B extends below the plane of recessed surface 34 into respective recesses 38A and 39B. In the illustrated embodiment of FIG. 3, recesses 38A and 38B are oval shaped and magnets 39A and 39B are rectangular in shape. In some embodiments, recesses 38A and 38B and magnets 39A and 29B may be any suitable shapes and/or sizes, so long as the shape of recesses 38A and 38B is capable of receiving the shape of magnets 39A and 39B. In some embodiments, the shape of magnets 39A and 39B, and the shape of recesses 38A and 39B, may be round, triangular, square, rectangular, or any other suitable shape or combination of shapes. It will be understood that two magnets do not need to be used. In some embodiments, less or more than two magnets may be used. In the illustrated embodiment, recessed surface 34 is displayed as rectangular in shape, with four curved edges, one at each corner of the rectangular shape. Recessed surface 34 may be any suitable shape that is capable of receiving a corresponding lens, insert, and backing plate.

FIG. 4 is a perspective view of a portion of faceplate 20 in accordance with some embodiments of the present disclosure. The perspective view of FIG. 4 illustrates additional detail of faceplate 20. As shown, magnets 39A and 39B protrude from recesses 38A and 38B. As such, magnets 39A and 39B extend above and below the opening of recesses 38A and 38B. In some embodiments, magnets 39A and 39B extend above the opening of recesses 38A and 38B a distance approximately equal to the thickness of the lens. FIG. 4 also shows one of small recesses 42 in internal edge 36A. A similar recess (not shown) is also present in internal edge 36C. Small recesses 42 are shaped such that they are configured to receive edge protrusions of a lens when the lens is positioned adjacent to recessed surface 34 in the recess of back surface 32 of faceplate 20. As illustrated, small recesses 42 comprise rectangular openings and concave shapes, configured to receive convex shaped protrusions of the lens. It will be understood that the shape of small recesses 42 is merely illustrative and that the shape of small recesses 42 may be any suitable shape that is capable of receiving the edge protrusions of a lens. As will be explained in more detail below, the protrusions of the lens and small recesses 42 operate together to help secure the lens to faceplate 20.

Figure 5:
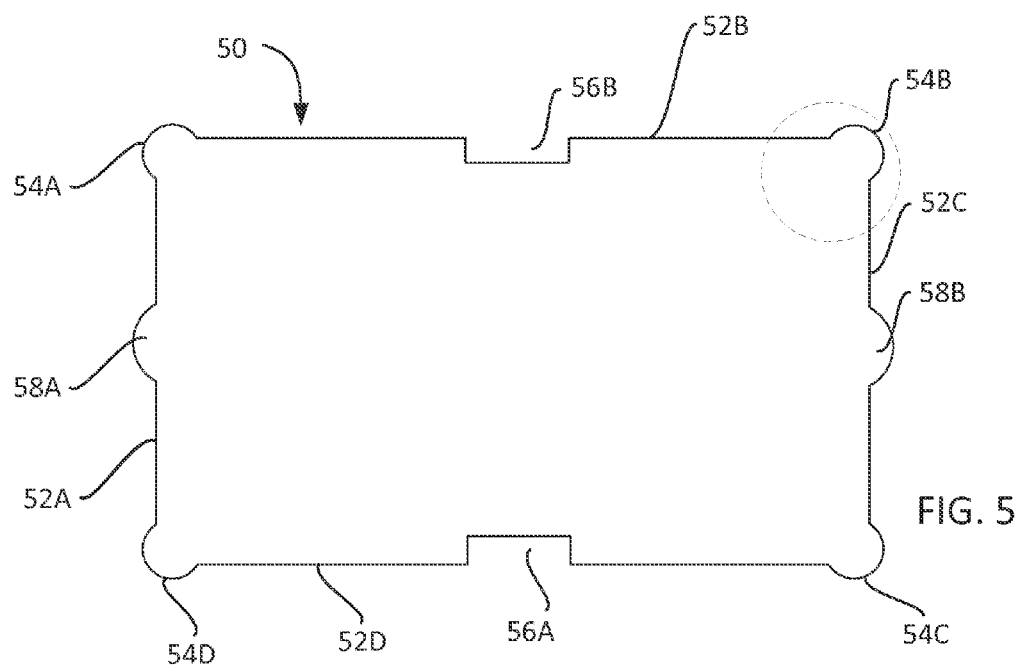
FIG. 5 is a plan view of a lens in accordance with some embodiments of the present disclosure.

FIG. 5 is a plan view of lens 50 in accordance with some embodiments of the present disclosure. Lens 50 may be a sheet of a transparent or translucent medium. For example, lens 50 may be made of glass, plastic, or any other suitable transparent or translucent material. In some embodiments, lens 50 may be made of acrylic, polycarbonate, petg, acetate, and/or glass. Lens 50 comprises four straight edges 52A-D and four curved edges 54A-D, where each curved edge connects the ends of two straight edges as illustrated. Opposite edges 52B and 52D comprise respective indentations 56B and 56A and opposite edges 52A and 52C comprise respective protrusions 58A and 58B. In the illustrated embodiment, lens 50 is configured to fit into the recess in the back of faceplate 20, such that magnets 39A and 39B of faceplate 20 pass through indentations 56A and 56B. Indentations 56A and 56B are shown as rectangular in shape to accommodate the rectangular shape of magnets 39A and 39B, however, it will be understood that indentations 56A and 56B may be any suitable shape which allows the magnets of the faceplate to pass through the indentations. In some embodiment, indentations 56A and 56B may be replaced with apertures configured to accommodate respective magnets 39A and 39B. Convex protrusions 58A and 58B are shaped such that they will fit into recesses 42 of faceplate 20, however, it will be understood that protrusions 58A and 58B may be any suitable shape such that they are able to be inserted into recesses 42. It will also be understood that any suitable number of protrusion and respective recesses may be used. When protrusions 58A and 58B are inserted into respective recesses 42 of faceplate 20, the fitting of the protrusions in the recesses enables lens 50 to be secured to faceplate 20. In the illustrated embodiment of FIG. 5, the distance between the ends of protrusions 58A and 58B is greater than the distance between internal edges 36A and 36C of faceplate 20. Therefore, in some embodiments, lens 50 is capable of being elastically bent to reduce the linear distance between protrusions 58A and 58B to enable the protrusions to pass between internal edges 36A and 36C of faceplate 20. When lens 50, in a bent shape, is positioned in the recess of faceplate 20, such that the protrusions 58A and 58B are aligned with the openings of respective recesses 42, the lens may be released from its bent shape causing the lens to return to its original shape. As lens 50 returns to its original shape, the linear distance between protrusions 58A and 58B increases, which causes the protrusions to enter into respective recesses 42.

Figure 6:
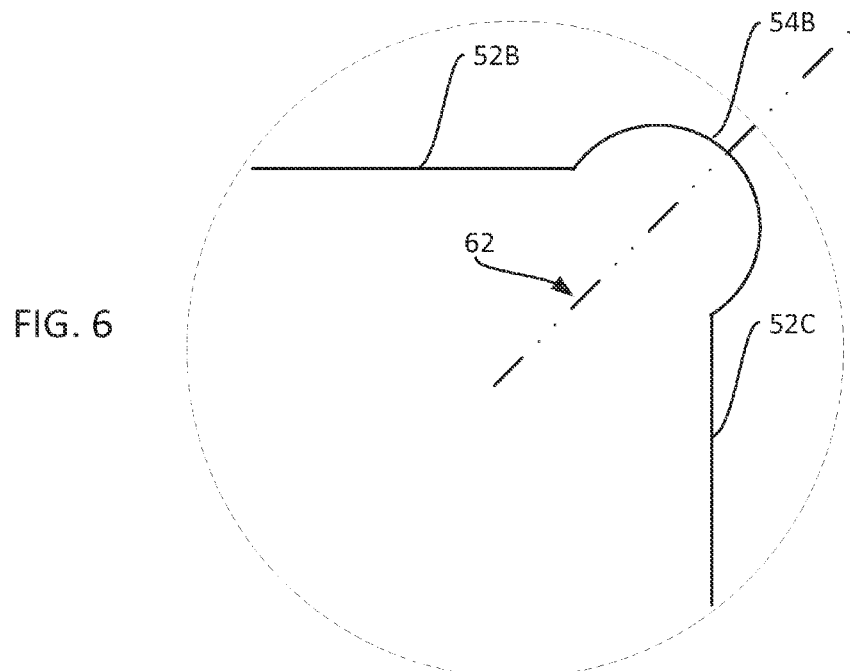
FIG. 6 is an enlarged view of a curved edge of the lens in accordance with some embodiments of the present disclosure.

It will be understood that the edge shape of lens 50 is merely illustrative and that any suitable shape may be used that enables the lens to fit into the recess of faceplate 20. As illustrated, lens 50 includes curved edges 54A-D. These curves match respective curves in the internal edge of the recess in faceplate 20. FIG. 6 is an enlarged view of curved edge 54B of lens 50 in accordance with some embodiments of the present disclosure. While the enlarged curved edge illustrated in FIG. 6 is referred to as edge 54B of lens 50, the shape and description of the curved edge of FIG. 6 may also apply to the other curved edges of lens 50, as well as to the curved edges of the recess in faceplate 20 and the curved edges of the backing plate. As illustrated, curved edge 54B connects the ends of straight edges 52B and 52C, where straight edges 52B and 52C may be considered to be two of four straight edges which form the sides of a rectangle. Curved edge 54B is located at the corner of the rectangle formed by the straight edges 52B and 52C, where curve 54B extends beyond the corner of the rectangle. Curved edge 54B is approximately symmetrical about angle bisector axis 62, which extends through the corner of the rectangle where curved edge 23 is located.

Figure 7:
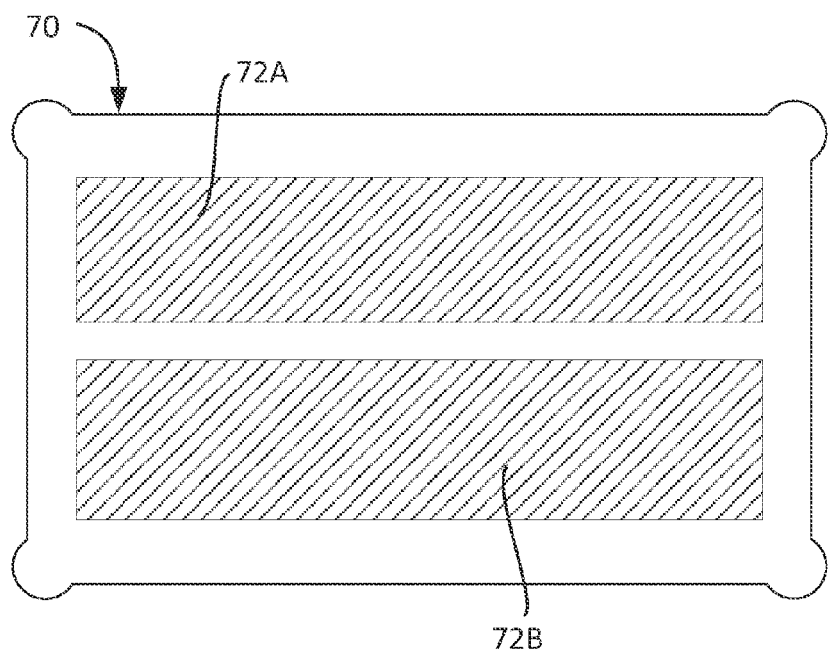
FIG. 7 is a plan view of the back surface of a backing plate in accordance with some embodiments of the present disclosure.

FIG. 7 is a plan view of the back surface of backing plate 70 in accordance with some embodiments of the present disclosure. As illustrated, backing plate 70 comprises four straight edges and four curved edges, such that each curved edge connects two straight edges. The shape of backing plate 70 may be the same as the shape of lens 50, without the recesses and protrusions in the straight edges of lens 50. Backing plate 70 is configured to fit into the recess of faceplate 20. It will be understood that the shape of backing plate 70 may be any suitable shape that is capable of being positioned in the recess of faceplate 20. As illustrated, sticky mediums 72A and 72B are attached to the back surface of backing plate 70. Sticky mediums 72A and 72B may be made of a material having adhesive properties. For example, sticky mediums 72A and 72B may be double-sided tape. Sticky mediums 72A and 72B are configured to adhere backing plate 70 to a surface, such as a wall surface. Sticky mediums 72A and 72B are illustrated as being rectangular in shape, however, they can be any suitable shape that enables backing plate 70 to adhere to a surface. It will also be understood that less or more than two sticky mediums may be used to adhere backing plate 70 to a surface. In some embodiments, backing plate 70 may be attached to a surface using any other suitable attachment technique or combination of techniques. For example, in some embodiments backing plate 70 may include one or more recessed screw holes so that backing plate 70 can be attached to a surface using one or more screws. Backing plate 70 may also be attached to a surface using hanging clips, brackets, fabric pins, glues and adhesives, hook and loop fasteners (e.g., hook and loop fasteners sold under the trademark Velcro), snaps, buttons, any other suitable attachment techniques, and any combination thereof.

Backing plate 70 may be made of a ferromagnetic material, such that when lens 50 and backing plate 70 are positioned in the recess of faceplate 20, at least one magnet, for example, magnet 39A and/or 39B, exerts a force on backing plate 70 to maintain faceplate 20, lens 50, and backing plate 70 together. Generally speaking, in operation, the backing plate is typically first attached to a surface. Then, the lens and an insert are positioned in the recess of the faceplate. With the recess of the faceplate aligned with the backing plate, the faceplate is moved towards the backing plate so that the backing plate enters the recess of the faceplate. When the faceplate, together with the lens and an insert, are positioned onto the backing plate, the faceplate, lens, and insert are secured to the backing plate, and thus the surface, based on the force exerted by one or magnetics in the faceplate, such that when the backing plate, lens, and faceplate are all attached, the wall sign will adhere to the wall via sticky mediums 72A and 72B.

Figure 8:
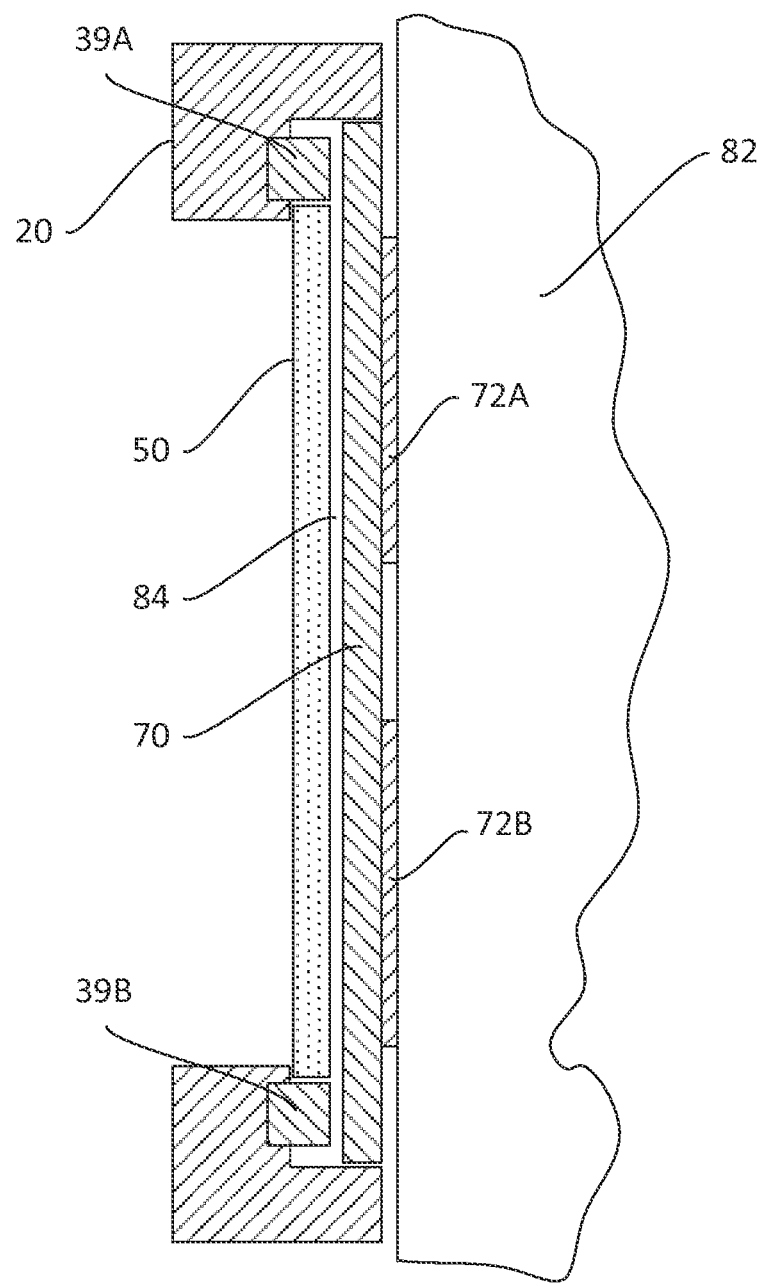
FIG. 8 is a cross-sectional view of an installed wall sign, taken along line 8-8 of FIG. 3, in accordance with some embodiments of the present disclosure.

FIG. 8 is a cross-sectional view of an installed sign and display system, taken along line 8-8 of FIG. 3, in accordance with some embodiments of the present disclosure. The cross-sectional view shows backing plate 70 attached to wall 82 via sticky mediums 72A and 72B. Faceplate 20 and lens 50 are secured to backing plate 70 via the force exerted on backing plate 70 by magnets 39A and 39B. As shown in FIG. 8, the surfaces of magnets 39A and 39B facing backing plate 70 are approximately in the same plane as the surface of lens 50 that is facing backing plate 70. This brings magnets 39A and 39B close to backing plate 70, which increases the force exerted by magnets 39A and 39B. In some embodiments, an insert (not shown) displaying content or information such as text and/or graphics may be inserted into space 84 shown between lens 50 and backing plate 70. When an insert is positioned in space 84, the insert is visible through lens 50 and the viewing aperture of faceplate 20. The insert may be made of a material suitable for presenting information or content such as text and/or graphics. For example, the insert may be made of paper, card stock, plastic, clear acetate, clear film, thin metal, any other suitable material, and any suitable combination thereof. It will be understood that the presence of space 84 is merely illustrative and that in use, lens 50 may be adjacent to backing plate 70 and if an insert is used, one side of the insert may be adjacent to lens 50 and the other side of the insert may be adjacent to backing plate 70. It will also be understood that the sticky mediums 72A and 72B may be any suitable thickness. In some embodiments, sticky mediums 72A and 72B may have sufficient thickness such that the sign and display system will appear to be floating off of wall 82.

Figure 9:
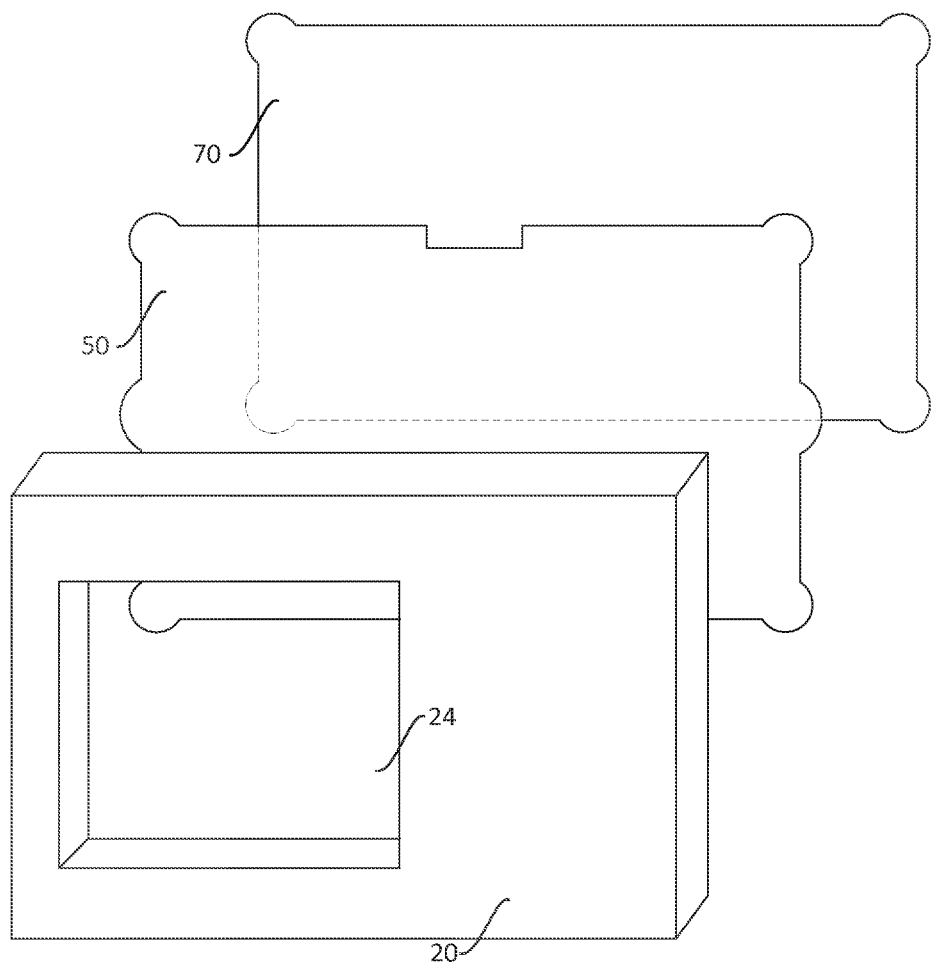
FIG. 9 is an exploded view of the components of the sign and display system in accordance with some embodiments of the present disclosure.

FIG. 9 is an exploded view of the components of the sign and display system, showing the order in which they are assembled together, in accordance with some embodiments of the present invention. Faceplate 20 is shown as the front of the sign and display system, followed by lens 50, and then backing plate 70. As explained above, lens 50 fits into a recess in the rear of faceplate 20. In addition, backing plate 70 also fits in into the recess of faceplate 20, adjacent to lens 50. When assembled, a first surface of lens 50 faces the recessed surface on the back of the faceplate 20, and a second surface of lens 50 faces a first surface of backing plate 70. The second surface of backing plate 70 may have attached to it at least one sticky medium, such as sticky medium 72A and/or 72B, which are used to adhere the sign and display system to a wall surface. In some embodiments, the components of the wall sign may include an insert positioned between lens 50 and backing plate 70.

Figure 1:
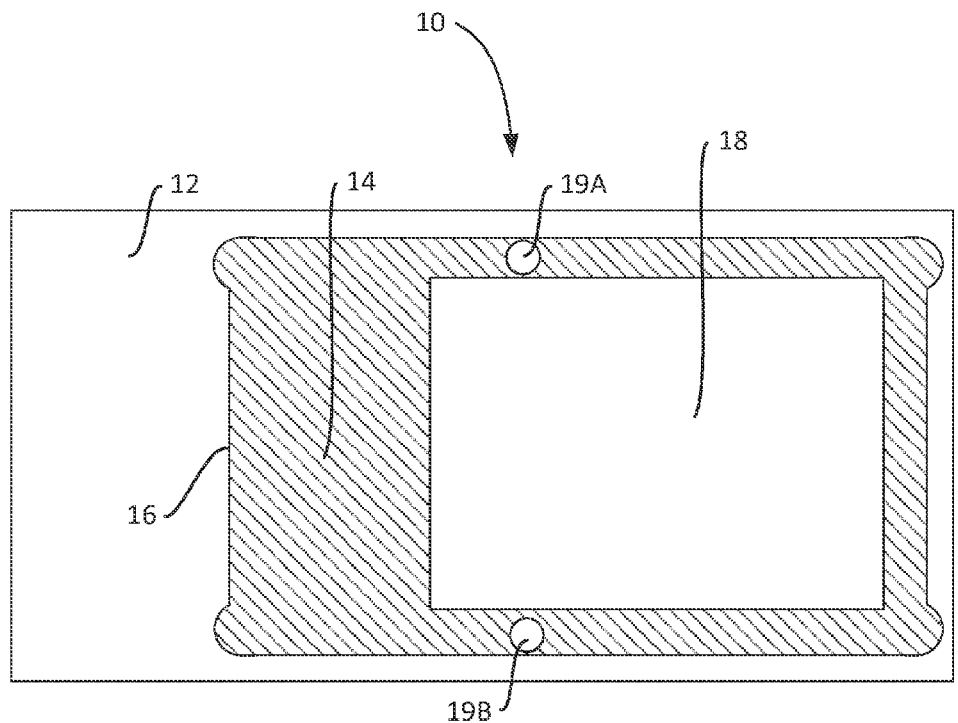
FIG. 1 is a plan view of the back of a faceplate of a prior art sign system.

It will be understood that the curved corners of the recess in the faceplate and the curved corners of the lens and backing plate may have different shape configurations. For example, instead of the curved corners being approximately symmetrical about an angle bisector axis for the corners, the curved corners may not be symmetric. For example, the curved corners may be positioned as shown in FIG. 1.

Figure 10:
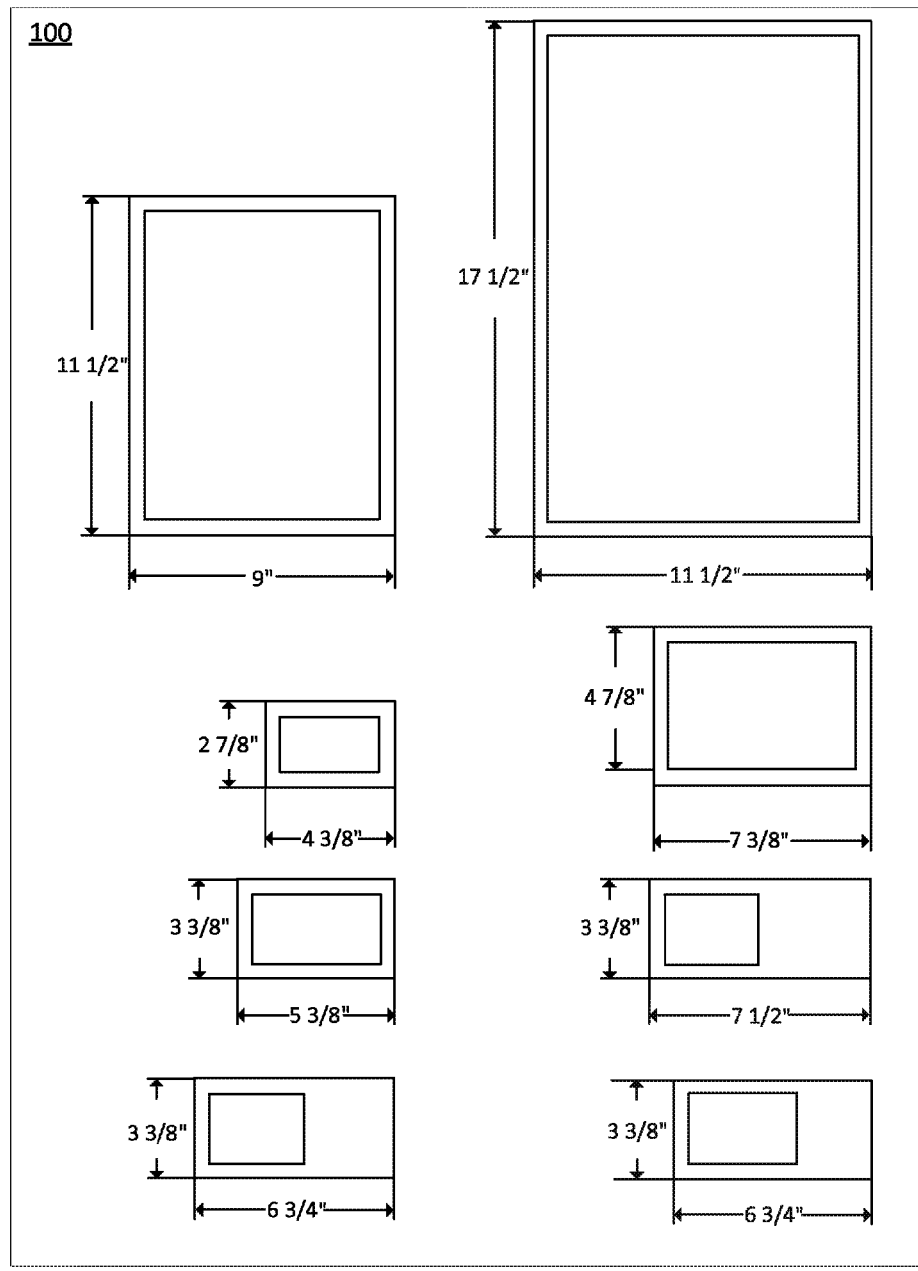
FIG. 10 is a panel of illustrative shapes and geometries of faceplates in accordance with some embodiments of the present disclosure.

It will also be understood that the shape of the sign and display system components depicted in FIGS. 2-9 is merely illustrative and that the sign and display system components of the present disclosure can be made in any suitable shapes having any suitable geometries. FIG. 10 is a panel 100 of illustrative shapes and geometries of faceplates in accordance with some embodiments of the present disclosure. Panel 100 depicts the front surfaces of eight different faceplates having different shapes and geometries. Each depicted faceplate comprises two rectangular shapes with dimensions noted for the external rectangular shape, which corresponds to the external edge of the faceplate. The internal rectangular shape of each depicted faceplate represents the size and location of the viewing aperture. As illustrated, in some embodiments, the distance between the external edge of the faceplate and the edge of the viewing aperture may be approximately the same for all four sides of the faceplate. In some embodiments, the distance between the external edge of the faceplate and the edge of the viewing aperture may be different for at least one of the sides of the faceplate. It will be understood that each of the faceplates depicted in FIG. 10 has a recess in its back surface configured to receive a suitably shaped lens, insert, and backing plate. It will be understood that the faceplates depicted in FIG. 10 and other sized faceplates of the present disclosure may have recesses sized to fit any suitably sized inserts. For example, the sign and display systems of the present disclosure may be configured to receive inserts having the following sizes: business card sizes (e.g., 3.5"×2"), index card sizes (e.g., 3"×5" and 4"×6"), post card sizes (e.g., 6"×4.25", 7"×5", 8.5"×6", 9"×6", and 11"×6"), letter size (i.e., 8.5"×11"), tabloid size (i.e., 11"×17"), arch D. size (i.e., 24"×36"), and any other suitable sizes. It will also be understood that the shapes and geometries of the faceplates in FIG. 10 is merely illustrative and that any other suitable shapes and geometries may be used.

Figure 11:
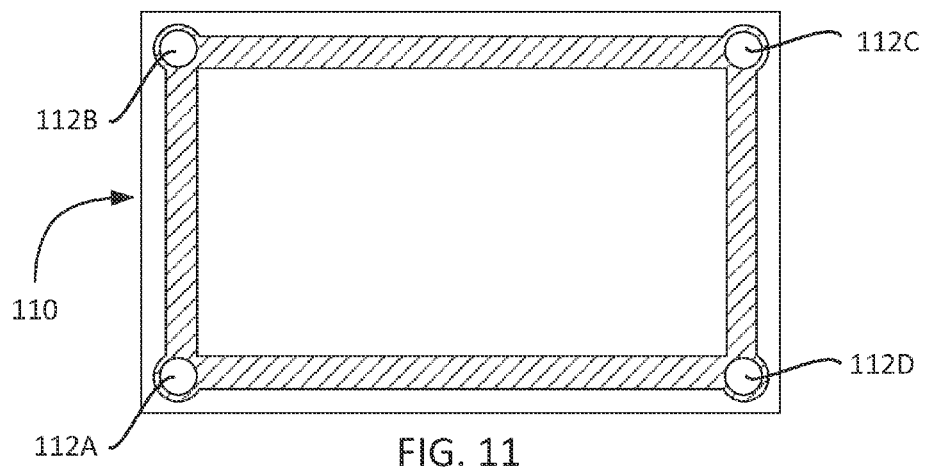
FIG. 11 is a plan view of the back of a faceplate in accordance with some embodiments of the present disclosure.
Figure 12:
FIG. 12 is a plan view of a lens in accordance with some embodiments of the present disclosure.
Figure 13:
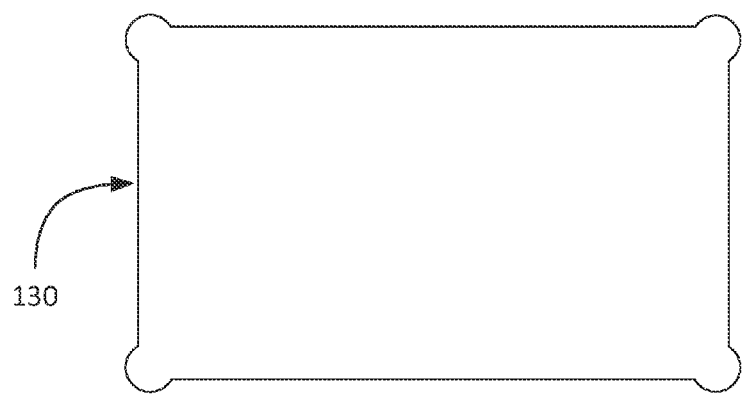
FIG. 13 is a plan view of the front surface of a backing plate in accordance with some embodiments of the present disclosure.

FIGS. 11-13 show a different configuration of the faceplate, lens, and backing plate of the sign and display system described above in connection with FIGS. 2-9. FIG. 11 is a plan view of the back of faceplate 110 in accordance with some embodiments of the present disclosure. The back of faceplate 110 includes a recessed back surface with four round magnetics 112A-D, each located in a corner of the recessed back surface. Similar to magnets 39A-D, a portion of each of magnets 112A-D may extend below the plane of the recessed surface into a respective recess and a portion of each of magnets 112A-D may extend above the recessed surface. In some embodiments, magnets 112A-D may extend above the recessed surface an amount approximately equal to the thickness of the lens that is configured to be inserted into the recess. By locating the magnets in the corners of the recessed surface, it may be possible to minimize the thickness of the frame of the faceplate (i.e., the distance between the external edge of the faceplate and the viewing aperture). FIG. 12 is a plan view of lens 120 in accordance with some embodiments of the present disclosure. Lens 120 is configured to fit into the recess in the back surface of faceplate 110. Each corner of lens 120 includes a concave edge to accommodate the round shape of magnets 112A-D. In addition, the left and right edges of lens 120 each includes two convex protrusions configured to enter recesses (not shown) in the sides of the recess in the back of faceplate 110. FIG. 13 is a plan view of the front surface of backing plate 130 in accordance with some embodiments of the present disclosure. Backing plate 130 is configured to fit into the recess in the back surface of faceplate 110.

It will be understood that the sign and display systems of the present disclosure can be used for various purposes. For example, the sign and display systems may be used to display phone directories, office directories, art, artwork, pictures, business cards, employee names, office names or numbers, messages, any other suitable content or information, and any combination thereof. It will be also understood that the design of the disclosed sign and display systems enables the content to be easily changed by applying sufficient force on the faceplate to overcome the force exerted by the at least one magnet to remove the faceplate. In some embodiments, the insert for displaying content may also include one or more recesses and/or apertures to accommodate the one or more magnetics in the faceplate. In some embodiments, the surface of the at least one magnet may extend above the recessed back surface a distance approximately equal to the combined thickness of the lens and insert. This may maximize the force exerted by the at least one magnetic on the backing plate.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed:

1. A system comprising:
   a faceplate comprising:
      a front surface;
      a back surface opposite the front surface;
      at least one external edge connecting the front and back surfaces;
      a recessed back surface;
      at least one internal edge connecting the recessed back surface and the back surface, wherein the recessed back surface and the at least one internal edge define a recess in the back surface; and
      a viewing aperture, wherein when the faceplate is viewed perpendicular to the front surface, the viewing aperture enables one to see through the faceplate;
   first and second magnets that protrude from the recessed back surface of the faceplate;
   a lens comprising:
      a first surface;
      a second surface opposite the first surface, wherein the lens is configured to fit into the recess of the faceplate such that the first surface of the lens is facing the recessed back surface of the faceplate; and
      first and second edges connecting the first and second surfaces of the lens, wherein the first and second edges comprise respective first and second indentations, and wherein the first and second indentations are shaped such that when the lens is positioned in the recess of the faceplate, the first and second indentations accommodate the protrusion of the respective first and second magnets;
   a backing plate having ferromagnetic properties, the backing plate comprising:
      a first surface; and
      a second surface opposite the first surface, wherein the backing plate is configured to fit into the recess of the faceplate, and wherein when the lens and backing plate are positioned in the recess of the faceplate, the first surface of the lens is facing the recessed back surface of the faceplate, the second surface of the lens is facing the first surface of the backing plate, and the first and second magnets exert a force on the backing plate to maintain the faceplate, lens, and backing plate together.

2. The system of claim 1, wherein the first and second magnets comprise first and second rectangular magnets.

3. The system of claim 2, wherein the recessed surface comprises first and second recesses configured to respectively receive the first and second rectangular magnets, such that a portion of each of the first and second magnets extends below the recessed surface.

4. The system of claim 2, wherein the first and second indentations are rectangular.

5. The system of claim 1, wherein the at least one internal edge comprises four straight edges and four curved edges such that each curved edge connects two straight edges and wherein the recess in the back surface comprises four curved corner recess portions defined by the four curved edges.

6. The system of claim 5, wherein the lens comprises four straight edges and four curved edges such that each curved edge connects two straight edges, and wherein when the lens is positioned in the recess of the faceplate, each of the four curved edges of the lens are configured to fit into a respective curved corner recess portion of the faceplate.

7. The system of claim 5, wherein the backing plate comprises four straight edges and four curved edges such that each curved edge connects two straight edges, and wherein when the backing plate is positioned in the recess of the faceplate, each of the four curved edges of the backing plate are configured to fit into a respective curved corner recess portion of the faceplate.

8. The system of claim 5, wherein the four straight edges form the sides of a rectangle, wherein the four straight edges do not extend to the corners of the rectangle, wherein each of the four curved edges is located at a respective corner of the rectangle, wherein each of the four curved edges extends beyond its respective corner of the rectangle, wherein each of the four corners of the rectangle comprises an angle bisector axis, and wherein each of the four curved edges is approximately symmetrical about the angle bisector axis of its respective corner.

9. The system of claim 1, further comprising first and second sticky mediums attached to the second surface of the backing plate, wherein the first and second sticky mediums are configured to adhere to a wall surface.

10. The system of claim 1, wherein the faceplate is rectangular in shape.

11. The system of claim 1, wherein the viewing aperture of the faceplate is rectangular in shape.

12. The system of claim 1, wherein the recess of the faceplate is rectangular in shape.

13. The system of claim 1, wherein the lens comprises opposite first and second protrusions, wherein the at least one internal edge of the faceplate comprises opposite first and second internal edges, and wherein the first and second internal edges comprise respective first and second recesses configured to receive respective first and second protrusions of the lens when the lens is positioned in the recess of the faceplate.

14. The system of claim 13, wherein the first and second recesses of the respective first and second internal edge surfaces each comprise a rectangular opening and a concave shape.

15. The system of claim 13, wherein the first and second protrusions of the respective first and second edges of the lens comprise a convex shape.

16. The system of claim 13, wherein the distance between the ends of the opposite first and second protrusions is greater than the distance between the first and second internal edges, wherein the lens is capable of being elastically bent to reduce the distance between the opposite first and second protrusions in order to enable the lens to be positioned in the recess, and wherein when the lens is positioned in the recess and when the lens is released from its bent shape, the lens returns to its original shape thereby increasing the distance between the opposite first and second protrusions and causing the first and second protrusion to extend into the respective first and second recesses.

17. The system of claim 1, wherein the viewing aperture of the faceplate is smaller in size than the recessed surface of the faceplate.

18. The system of claim 1, wherein the lens comprises a transparent medium.

19. The system of claim 1, further comprising an insert upon which text and/or graphics may be presented, wherein the insert can be positioned between the lens and backing plate such that when the lens, insert, and backing plate are positioned in the recess of the faceplate, the text and/or graphics are visible through the viewing aperture of the faceplate.

* * * * *